July 14, 1959 G. L. FREDENDALL 2,895,004

COLOR TELEVISION

Filed April 28, 1954 4 Sheets-Sheet 1

INVENTOR.
Gordon L. Fredendall
BY
[signature]
ATTORNEY

INVENTOR.
Gordon L. Fredendall
BY
ATTORNEY

July 14, 1959 G. L. FREDENDALL 2,895,004

COLOR TELEVISION

Filed April 28, 1954 4 Sheets-Sheet 3

INVENTOR.
Gordon L. Fredendall
BY
Olin O. Mitchell
ATTORNEY

INVENTOR.
Gordon L. Fredendall
BY Olin J. Mitchell
ATTORNEY 2,895,004

COLOR TELEVISION

Gordon L. Fredendall, Huntingdon Valley, Pa., assignor to Radio Corporation of America, a corporation of Delaware Application April 28, 1954, Serial No. 426,145

7 Claims. (Cl. 178—5.4)

The present invention relates to automatic pass band and bandwidth control systems, and in particular to automatic bandwidth control circuits for distinguishing between either the presence or absence of brightness detail components, or between a monochrome signal or a color signal, as applied to color television receivers, and to the establishment of optimum circuit operation for each type of signal.

The need for the present invention will become apparent upon a study of the type of color television signal which was approved for commercial transmission in the United States by the Federal Communications Commission on December 17, 1953. In this color television signal, two types of image information are transmitted. One is known as the monochrome or luminance information. It is provided by cross mixing red, green and blue primary signals to produce a signal according to the equation.

$$Y=.30R+.59G+.11B$$

This signal is generated in accordance with existing standing standards of 525 lines, 60 fields per second, and 30 frames per second, and is treated exactly like a standard monochrome signal with respect to bandwidth and the addition of synchronizing and blanking pulses. The primary signals, as mixed together in the proportions given in the preceding equation, produce a white matching typical daylight. This signal yields, therefore, the gamut from black to white through shades and tones of gray, and may be received on a standard monochrome receiver to give a satisfactory black and white representation of a transmitted color image.

In addition to the luminance signal, there is also transmitted the color information. The color information is transmitted in the form of what are called color difference signals. It follows that it should be possible to utilize directly signals of the type $R-Y$, $B-Y$, and $G-Y$, which represent respectively red, blue and green color difference signals. These signals represent the deviations from the combination of color signals given by the representation for Y, and when each is individually added to Y give the amount of color representing that particular primary image component.

It would only be necessary to transmit directly two of the three color difference signals, since the signals are interrelated, and once any two are known, the third may be suitably recovered. However, because the eye has highest acuity along the orange-cyan color axis in the chrominance diagram it has been found more convenient, in one method of transmission, to transmit a so-called I signal, which represents orange-cyan information, and a so-called Q signal, which represents principally green-purple axis information. The I and Q signals are utilized to modulate a subcarrier. In the process used, in order to avoid the use of two subcarriers, the Q signal is utilized to amplitude modulate one subcarrier; and the I signal is utilized to amplitude modulate another subcarrier having the same frequency as the first, but having a phase 90° out of phase. The addition of the I and Q modulated subcarriers then yields a modulated subcarrier or chrominance signal, which, when produced in a suitable balanced modulator, has the added advantage of having the subcarrier frequency suppressed.

The subcarrier frequency utilized to transmit the chrominance information is approximately 3.58 megacycles. The chrominance information may be recovered from the subcarrier by the use of the process of synchronous detection, that is, the process of beating the subcarrier with a wave of the same frequency but of prescribed phase, one phase corresponding to the I signal and one phase corresponding to the Q signal. Actually, because of the unique nature of the modulated subcarrier signal, the $R-Y$, $G-Y$ and $B-Y$ signal information may also be synchronously detected by utilizing the synchronous detection waves of corresponding phase. In order for synchronous detection to be possible in a receiver it is necessary that a properly phased locally generated signal be produced in the receiver; this signal should be in synchronism with the master oscillator at the transmitter. In order that this be made possible, a color synchronizing burst consisting of substantially 8 cycles of the 3.58 megacycle subcarrier is included on the back porch of the horizontal synchronizing pulse. The phase of this color synchronizing burst is such that it leads the I signal by 57°, which in turn leads the Q signal by 90°.

The preceding description has dealt with the more general aspects of the television transmission system, whereby a black and white receiver will suitably display a monochrome picture from the luminance part of the signal, and also, a color television receiver will only display a monochrome picture if only monochrome information is received, or will display a color picture if the chrominance information accompanies the luminance information in accordance with the synchronizing information provided by the color synchronizing burst. There is a difficulty which is encountered with the design of a color television receiver, however, when the color television receiver is utilized to produce a black and white picture for a monochrome signal and a color picture from a color signal. If the black and white picture information contains spectrum components which are representative of a very high definition picture, namely up to and in the vicinity of 4 megacycles, it will then be desirable for the color television receiver to be able to give suitable response to such a signal. However, during color transmission it is desirable to eliminate the color subcarrier and its principal sidebands from the luminance signal in the color television receiver, since these signals may cause kinescope rectification as well as moire effects. It is therefore desirable to provide a transmission system which is automatically optimized to the type of signal coming in. Such an automatic bandwidth circuit can, of course, use the color synchronizing burst as an indicating signal to adjust the bandwidth for color transmission when the color signal is being transmitted; the absence of this color synchronizing burst could also be employed to cause the bandwidth of the transmission system to be suitable for monochrome signals should only a black and white picture be transmitted. In another form, it is possible, as will be shown, to utilize the presence of higher frequency luminance components of increased amplitude to control the automatic bandwidth circuits to be employed.

In the copending application by Roland N. Rhodes, entitled "Color Television," United States Serial No. 401,154, filed December 30, 1953, an automatic bandwidth control circuit, responsive to the control synchronizing burst, is used to control a degeneration circuit and trap in a television amplifier circuit to account for the presence or the absence of subcarrier components. The present invention constitutes an improvement over the teachings of R. N. Rhodes in that it teaches the use of complementary pass band filter channels which can be made responsive either to the color synchronizing burst, to the color subcarrier frequency range or to the higher frequency luminance components. In addition, it may be made line responsive or dot responsive; this is a matter of design.

It is therefore an object of this invention to provide improved circuitry for obtaining automatic pass band control.

It is another object of this invention to provide improved circuitry for changing bandwidth of a first transmission system in accordance with information presented by a reference signal.

It is still another object of this invention to provide an improved system for adjusting the bandwidth of a color television receiver to that suitable for either monochrome reception or color reception.

It is yet another object of this invention to provide a means for sharpennig monochrome detail in a color television receiver.

It is yet another object of this invention to provide an improved burst responsive control circuit which automatically increases the bandwidth of the luminance channel when the transmission is in monochrome.

It is still a further object of this invention to provide a means for automatically adjusting the pass band of the luminance channel in a color television receiver responsive to the presence or the absence of the color subcarrier signal.

It is still a further object of this invention to achieve an automatic control of the bandwidth of the luminance channel in a color television receiver which is responsive to the presence of higher frequency luminance detail components.

According to this invention, a pair of complementary filter channels are included in the luminance video amplifier in a color television receiver. One of the complementary filter channels has an elimination band in the vicinity of the color subcarrier frequency. The other of the complementary filter channels has a pass band only in the vicinity of the color subcarrier region. By making the filter channel with the pass band responsive to an identifying waveform in the color television signal, the luminance video amplifier may be made to have a band width up to and beyond the color subcarrier region, or may be caused to have a stop band in the vicinity of the color subcarrier frequency.

In one form of the invention, the pass band filter channel is made responsive to the color synchronizing burst so that when the color synchronizing burst is present, denoting the presence of chrominance information, the passband filter channel is closed, so the components in the vicinity of the color subcarrier frequency will not be passed by the elimination band in the first filter channel.

In another form of the invention, the pass band filter channel is caused to be responsive to the presence of the color subcarrier, so that should the color subcarrier region have harmonic components of substantial amplitude, the pass band filter channel will be cut off. This can be done so that the system will be either line-responsive or incremental-path responsive.

In still another form of the invention, the pass band filter channel is made responsive to brightness or luminance frequency components immediately below the chrominance band, that is in the vicinity from 1 to 2 megacycles. Should these components, which represent monochrome detail, be present in sufficient amplitude then the pass band filter channel is caused to operate to permit the higher frequency components of the color television signal to pass through the luminance video amplifier.

Other and incidental objects of this invention will become apparent upon a reading of the following specification and a study of the following figures in which.

Figure 5:
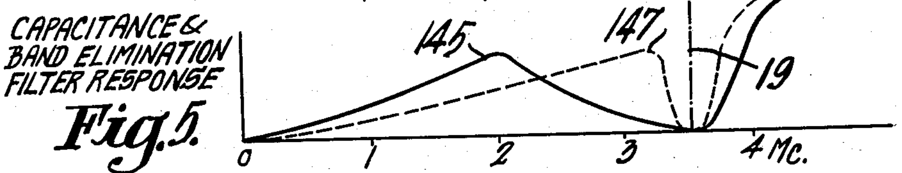
Figure 7:
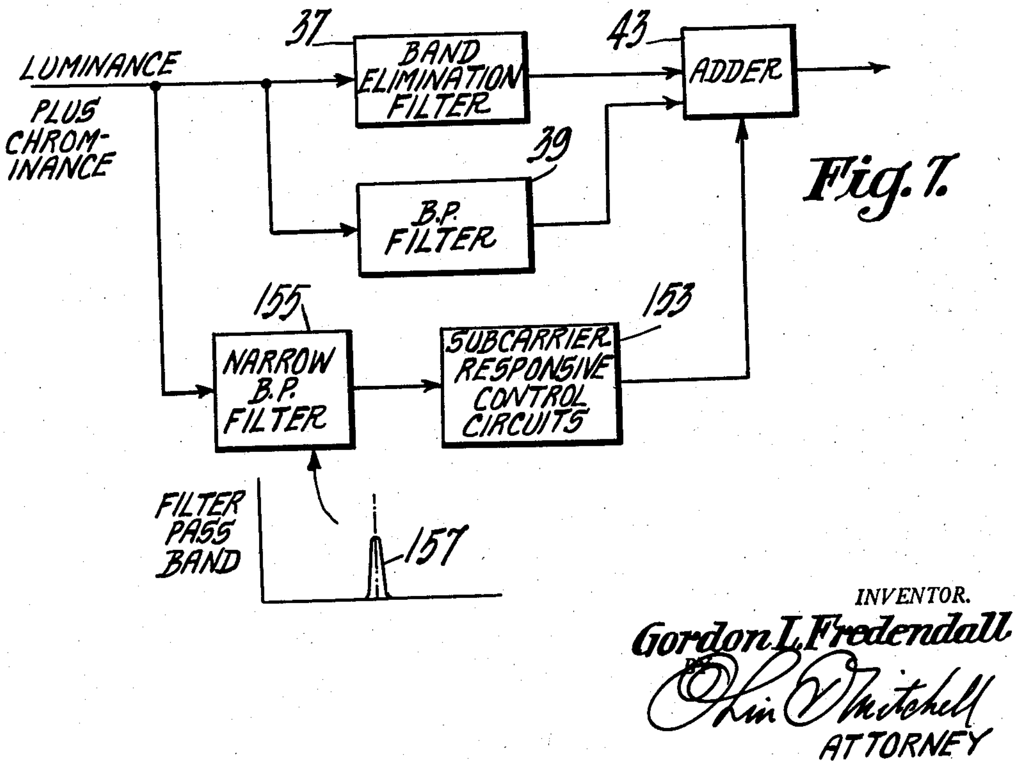
Figure 4:
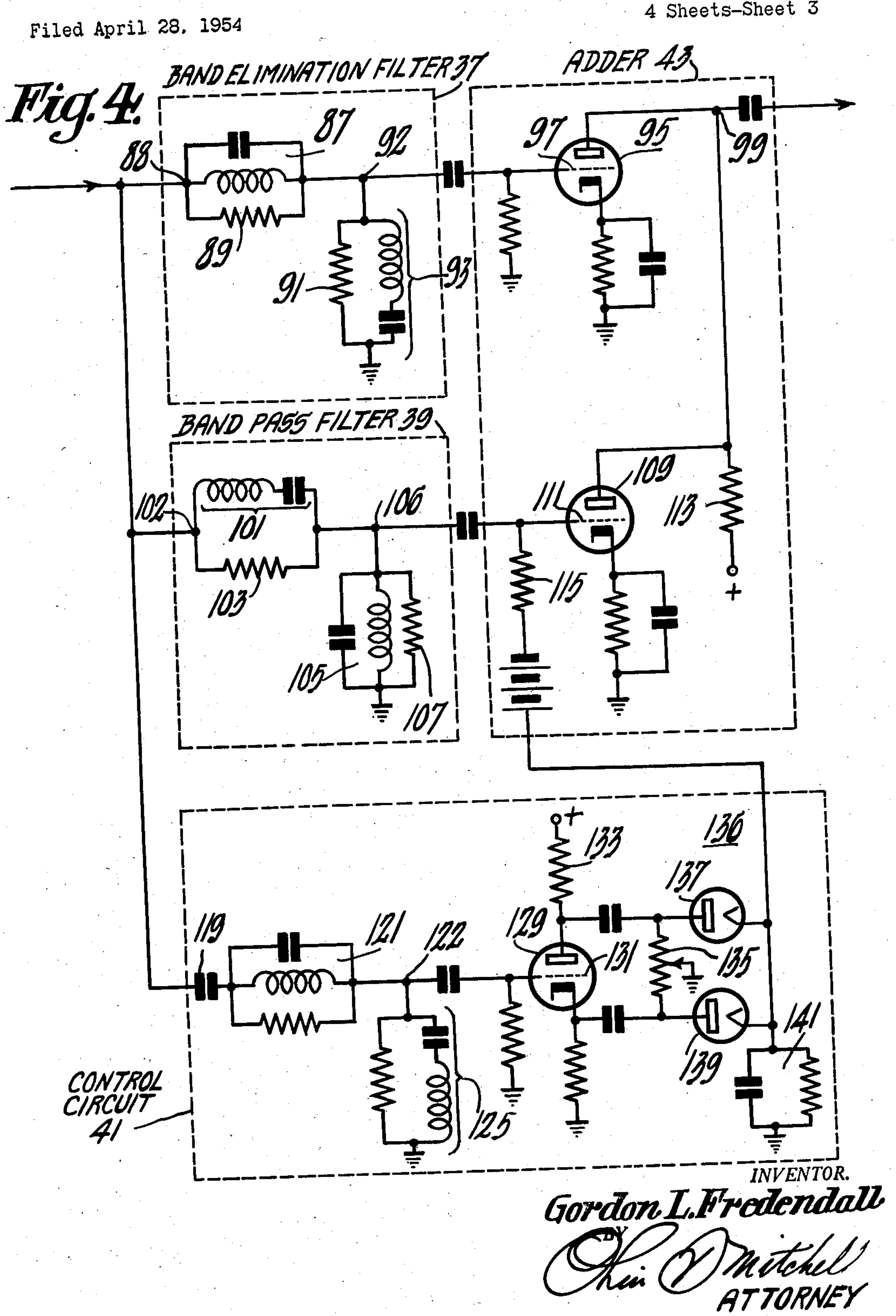
Figure 4 shows a circuit diagram of the band elimination filter, the band pass filter, the adder, and the control circuit shown in Figure 3.
Figure 6:
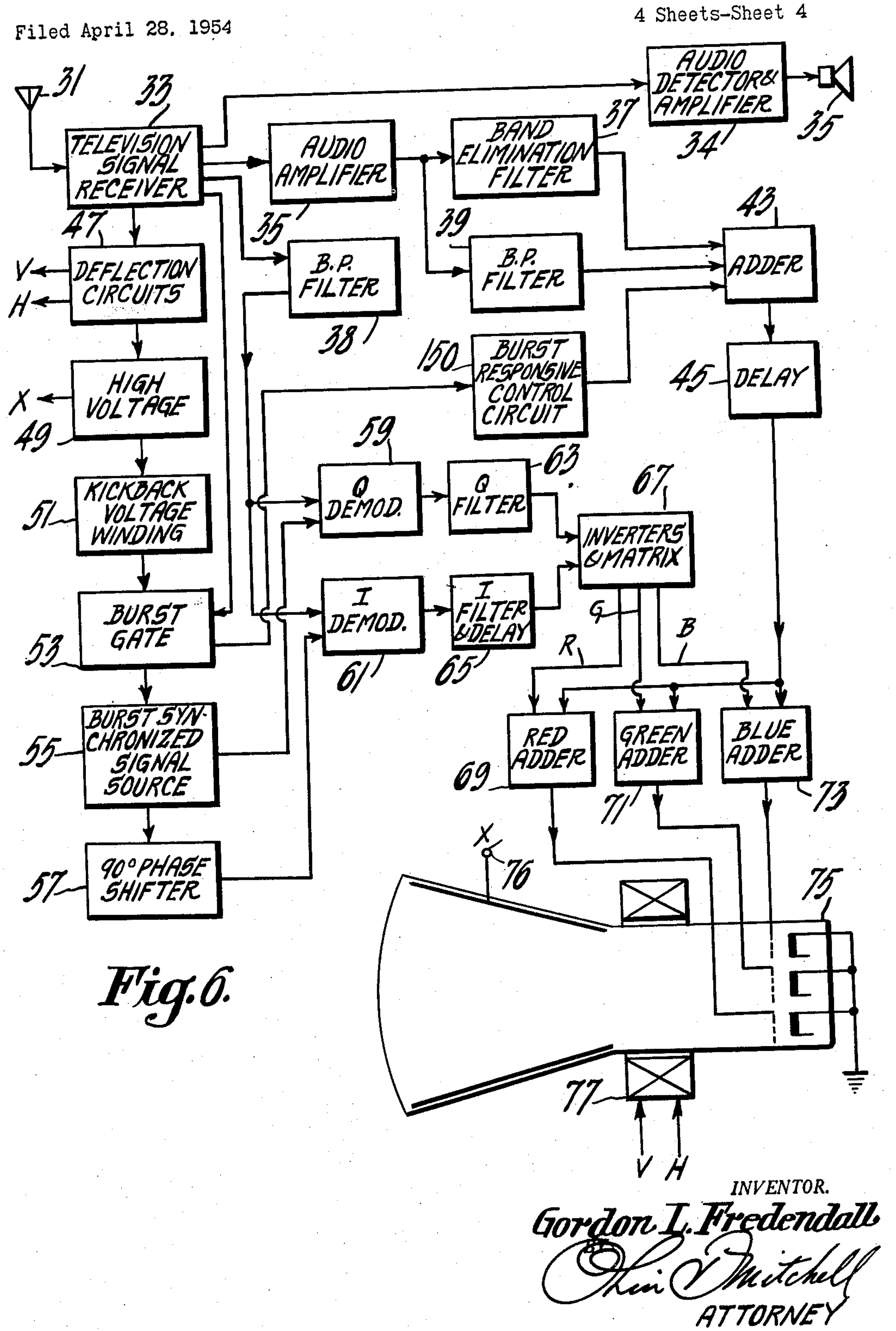

Figure 5 shows the response characteristics of the capacitance plus band elimination filter comprising capacitor 119, resonant circuit 121, and resonant circuit 125, in Figure 4;

Figure 6 shows the block diagram of a color television receiver employing the present invention which utilizes a burst responsive control circuit; and Figure 7 shows an automatic bandwidth control circuit embodying the present invention which utilizes a subcarrier responsive control circuit.

Before turning to the details associated with the present invention in its various forms consider first the frequency response characteristics of the luminance channel and the chrominance channel associated with a color television signal.

Figure 1:
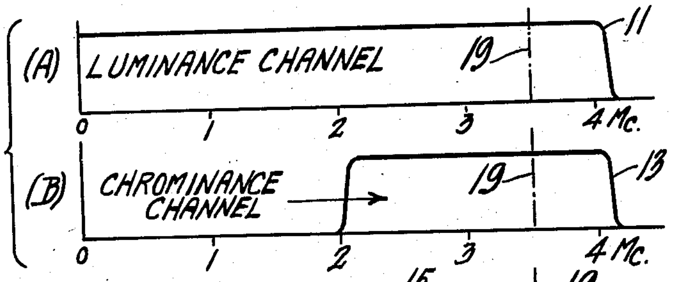
Figure 1A shows the frequency response characteristic of the luminance channel.
Figure 1B shows the frequency response characteristic of the chrominance channel.

The characteristic curve 11 of the luminance channel is shown in Figure 1A, which indicates that the channel encompasses a bandwidth from substantially 0 cycles to almost 4.2 cycles per second. The line 19 shows the location of the 3.58 megacycle color subcarrier frequency. Figure 1B shows the chrominance channel, which indicates that region which contains color difference or chrominance information. Note that the chrominance region extends only slightly more than one-half megacycle above the color subcarrier frequency 19, although the lower region of the chrominance channel extends one and one-half megacycles toward lower frequencies to almost two megacycles. In this way, the asymmetrical chrominance channel will accommodate the I signal, which is a high definition signal. The I signal has harmonic components, which are transmitted double sideband for components up to one-half megacycle and single sideband for components from one-half megacycle to one and one-half megacycle. The chrominance signal does not introduce cross talk into the luminance channel, due to the fact that the frequency of the color subcarrier is a multiple of one-half the line scanning frequency, so that the groups of side frequencies, which are characteristic of color television signal information, may be interspersed rather than superimposed.

Figure 2:
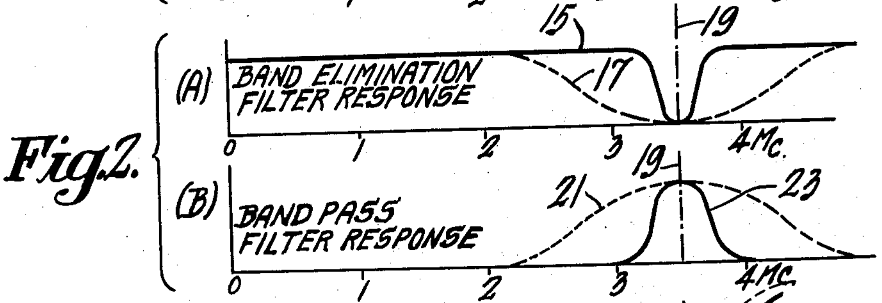
Figure 2A shows the band elimination filter channel response characteristics and Figure 2B shows the band pass filter channel response characteristics.

Consider now the case when it is desired that frequency components at or in the vicinity of the color subcarrier be eliminated from the luminance signal, which also contains chrominance information at the time when the television transmission describes color image. Then, as shown in Figure 2A, a band elimination filter response curve of the type shown as curve 15 or of the wide elimination band curve 17 may be utilized. However, when the television transmission is for a monochrome image having high definition, one method of restoring the components existing in the spectrum region eliminated by the band elimination filter is to utilize a second filter network for transmission, this filter network having the band pass characteristics shown either as the characteristic curve 23 for a narrow pass band, or as the characteristic curve 21 for a wide pass band.

It follows therefore that by utilizing two filter channels, one having the characteristic shown in Figure 2A, and one having the characteristic shown in Figure 2B, and by combining the outputs of these filter channels with the filter channel having the band pass filter response as shown in Figure 2B subjected to control responsive to a prescribed waveform, automatic elimination or transmission of signal components in one or more frequency ranges may be achieved.

Figure 3:
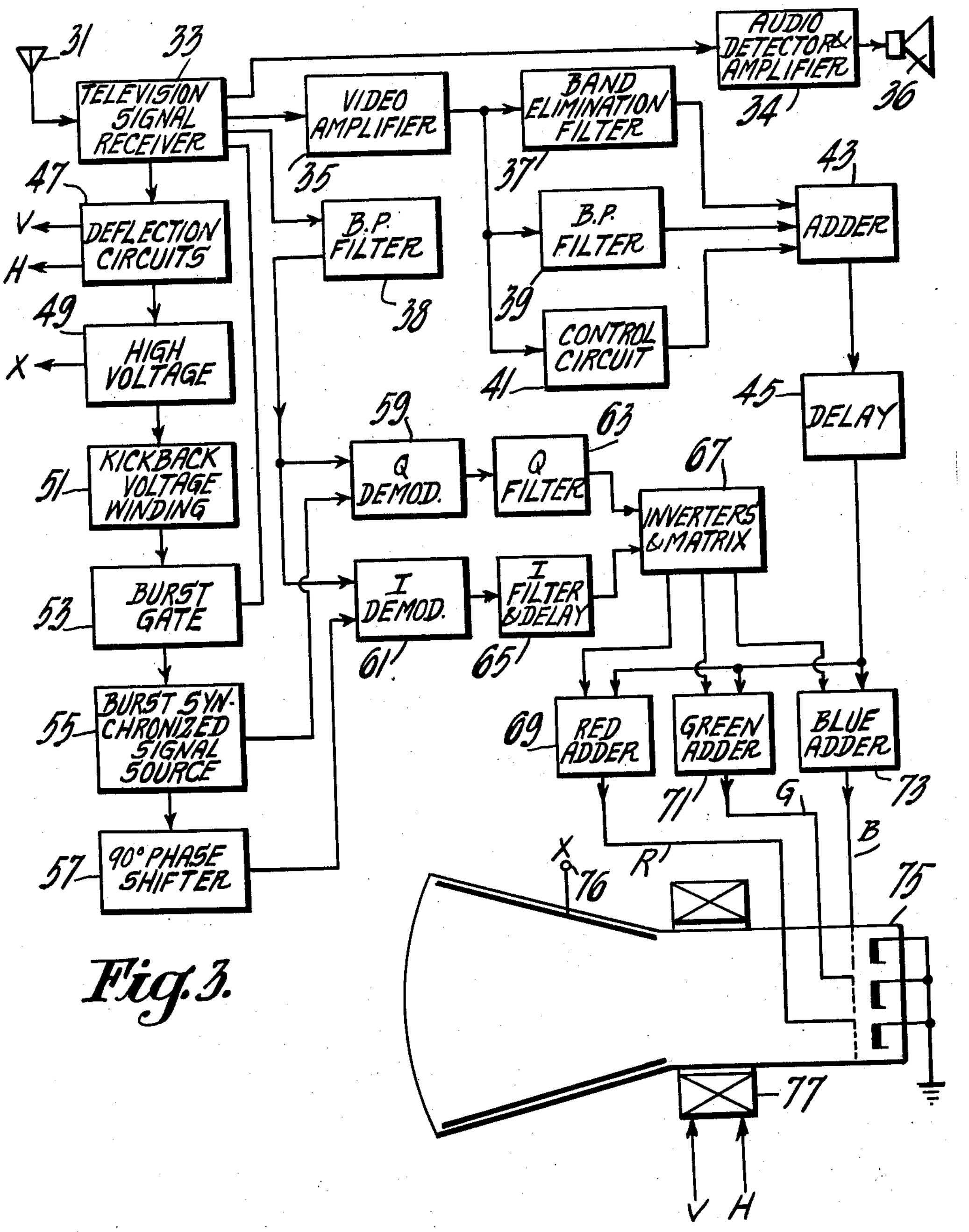
Figure 3 shows the block diagram of a color television receiver which employs one embodiment of the present invention, wherein the control circuit is responsive to the higher frequency brightness signal components.

Consider now the circuit shown in Figure 3. Here the television signal reaches the antenna 31, from which it is impressed on the television signal receiver 33. The television signal receiver 33 performs the function, now well known in the art, of first detection, intermediate frequency amplification, second detection and automatic gain control. For details of these and other aspects see, for example, the paper by Antony Wright, entitled "Television Receivers," in the March 1947 issue of RCA Review. At some stage in the television signal receiver 33 the sound information is separated from the television signal. The separated sound information using, for example, the principles of intercarrier sound, is then passed to the audio detector and amplifier 34 and then to the loud speaker 36.

The television signal receiver also has several channels which accommodate various portions of the received television signal. One of the channels feeds the television signal to the deflection circuits 47, which provide deflection signals for the deflection yokes 77. The deflection circuits also operate the high voltage circuit 49, which provide high voltage to the ultor 76. The high voltage circuit 49 usually includes the kick-back voltage winding 51, which may be utilized to open the burst gate 53 at the time of the color synchronizing burst. The television signal is passed into the burst gate 53, and by having the burst gate opened at the time of the burst, the burst is fed to the burst synchronized signal source 55 which produces an output signal at the phase prescribed by the burst. The output of the burst synchronized signal source 55 is also passed to the 90° phase shift 57.

The television signal is passed through the band pass filter 38, which has a band pass from approximately 2 to 4.2 megacycles. The amplifier 38 eliminates all luminance information outside of the chrominance band. The output of the band pass filter 38 is then fed simultaneously to the Q demodulator 59 and the I demodulator 61. By impressing demodulating signals from the burst synchronized signal source 55 and the 90° phase shifter 57 on the Q demodulator 59 and the I demodulator 61 respectively, the Q signal and the I signal are recovered, and passed respectively through the Q filter 63 and the I filter and delay circuit 65 to the inverter and matrix circuit 67. The output of the inverter and matrix circuit 67 then yields the $R-Y$ signal to the red adder 69, the $G-Y$ signal to the green adder 71, and the $B-Y$ signal to the blue adder 73.

Another branch of the output of the television signal receiver 33 passes the television signal through the video amplifier 35. The output of this video amplifier 35, which represents the luminance information, is then passed through the circuit which embodies the present invention, this circuit consisting of the band elimination filter 37, the band pass filter 39 and the control circuit 41. These circuits are connected to the adder 43, which utilizes the output of the control circuit 41 to control the contribution of the band pas filter 39 into the adder 43. The output of the adder 43, which now consists of an automatic bandwidth control luminance signal, is passed through the delay line 45 and is simultaneously applied to the red adder 69, the green adder 71 and the blue adder 73, which respectively yield the red signal, the green signal, and the blue signal. The latter signals are then applied to the proper control electrodes of the color kinescope 75.

The automatic bandwidth control circuit including the band elimination filter 37, the band pass filter 39, and the control circuit 41 with the adder circuit 43 in Figure 3, is responsive to luminance or brightness information as indicated by higher frequency components of this type of information. Consider the schematic diagram shown in Figure 4. Here the band elimination filter 37 consists of a parallel resonant circuit 87 in series with a series resonant circuit 93. The parallel resonant circuit 87 has the property that at resonance it exhibits the highest shunt impedance; in this case the shunt impedance will be given by the resistance 89. The series resonant circuit 93 has the inverse characteristic in that at resonance it creates a virtual short circuit between the terminal 92 and the ground terminal 90. If the impedance, as measured from the input terminal 88 to the ground terminal 90, is measured as a function of frequency, the fact that the resonant circuit 87 has an inverse impedance characteristic as compared to that of the series circuit 93 will cause the input resistance as seen from terminal 88 to the ground terminal 90 to be virtually constant, though the signal as developed across the terminal 92 to the ground terminal 90 will drop from a maximum value to a low value in this range of frequencies. If both the parallel resonant circuit 87 and the series resonant circuit 93 are tuned to the vicinity of the color subcarrier, then a band elimination filter response characteristic such as shown in Figure 2A will be achieved with the width of the elimination band a function of the losses introduced into both component resonant circuits.

Consider now the band pass filter 39. Here a series resonant circuit 101 is connected in series with the parallel resonant circuit 105. Since these resonant circuits have inverse impedance characteristics, as discussed in the preceding paragraph, then with the output signal built up across the parallel resonant circuit 105 the band pass filter will have a pass band in the vicinity of the resonant frequency of both of the resonant circuits. If this resonant frequency is chosen close to that of the color subcarrier frequency, then the pass band produced by the band pass filter 39 will be substantially that illustrated in Figure 2B. The actual width of the pass band will depend largely upon the losses as represented by the resistors 103 and 107.

The outputs of the band elimination filter 37 and band pass filter 39 are coupled to the adder circuit 43 which consists of two triodes with the anodes tied together and coupled to a mutual load 113. The band elimination filter is coupled to the grid 97 of the one adder triode 95, while the output of the band pass filter is coupled to the grid 111 of the adder triode 109.

It is desired that the output of the band pass filter 39 be susceptible to control as it enters the adder circuit 43. This is easily accomplished by controlling the D.C. grid bias and therefore the gain of the adder triode 109. The D.C. grid bias is furnished by the detector circuit 136, which includes the diodes 137 and 139 and the resistance-condenser network 141.

The action of the parallel resonant circuit 121 and the series resonant circuit 125 in the control circuit 41 follows identically from the principles described in connection with the parallel resonant circuit 87 and the series resonant circuit 93. Note the inclusion of the condenser 119, however, which is connected in series with the parallel resonant circuit 121. Because of the series reactance properties of a condenser as a function of frequency, the combined capacitance plus band elimination filter response will be that shown in Figure 5, as depicted by the curves 145 or 147 whose precise shapes are a function of the band width of the resonant circuits involved.

If increased detail is present in the monochrome signal, higher brightness components will be found in the vicinity from one and one-half to two megacycles, or even to possibly close to three megacycles, before these brightness components are confused with color information components. By utilizing a response curve of the type depicted by curve 145, for example, those brightness components in the vicinity of two megacycles will be transmitted with increased amplitude. If these brightness components are amplified by the vacuum tube 129 in control circuit 41 and then applied to the detector circuit 136, operation is achieved whereby the presence of higher brightness components in the vicinity of, for example, two megacycles, as represented by the curve 145, will cause the detector circuit 136 to develop sufficient bias to turn on the band pass filter 39 so that the higher brightness components in the vicinity of the color subcarrier will be tranmsitted through the adder. If these brightness components are not present, thereby representing the case when there is little monochrome detail in the particular region being described by the signal then the detector 136 receives little or no excitation, which causes the adder triode 109 to be biased off so that the color subcarrier region as represented by the curve in Figure 2B will be prevented from being transmitted through the adder circuit and only lower frequency monochrome components will be applied to the kinescope. Higher frequency color subcarrier components in the vicinity of the color subcarrier frequency will therefore be prevented from causing kinescope rectification or moire effects. It follows from design considerations of such a circuit that the automatic band width control circuit preferably be either line or incremental path length responsive, depending on the time constants employed in the detector circuit 136.

Another verision of the present invention involves the circuit shown in Figure 6. All components of Figure 6 are identical to the components previously described in connection with Figure 3, with the exception of the fact that the control circuit 41 in Figure 3 is replaced by the burst responsive control circuit 150, which is actuated by a burst from the burst gate 53. There are numerous methods of utilizing the burst as an identifying signal to indicate when color subcarrier information is present or not. One is to rectify the burst and subject it to detection. The detected signal may then be utilized to produce a bias voltage indicative of the presence or the absence of the burst. This bias voltage may then be utilized to control the adder triode 109 in Figure 4 so that when the color synchronizing burst is present, the adder triode 109 is caused to be biased off so that the information yielded by the band pass filter 39 does not go into the output of the adder 43. When the color synchronizing burst is not present, thereby signifying that only a monochrome picture is being transmitted, then the bias applied to the adder triode 109 should be such as to cause the triode 109 to conduct and amplify the output of the band pass filter 39, thereby adding any components transmitted by the band pass filter to the output of the adder 43.

Figure 7 shows still another version of the present invention. The adder 109 is caused to amplify or be turned off responsive to the presence of the color subcarrier, regardless of whether the color subcarrier be represented by the burst or by signal components very close to the subcarrier frequency since, as was previously noted, that actual subcarrier itself is not present due to the use of the suppressed carrier quadrature modulation subcarrier technique. There are many advantages to making the band pass filter circuit responsive to the color subcarrier. Should the portion of the color image change suddenly from a color to a monochrome and then change back to color, it is not necessary to penalize that entire line representing the information relating to both color and monochrome as would be done where the band pass filter circuit responsive to the color synchronizing burst. Instead, the band pass filter circuit 39 and its succeeding portion of the adder circuit 43 can be adapted so that the circuit will respond immediately to the presence or the absence of color during the scanning line. This is accomplished by utilizing the narrow band pass filter 155, which has the pass band 157 which will pass signal components very close to the color subcarrier. This narrow band pass filter may then be utilized to control a subcarrier responsive control circuit 153 which will control the adder circuit 43 so that when the color information in the vicinity of the color subcarrier is sufficiently large the adder triode 109 which accompanies signals from the band pass filter 39, will be cut off. When these signals as transmitted by the filter pass band 157 are not present, then the subcarrier responsive control circuits 153 should be adapted to cause the adder triode 109 to conduct and therefore amplify and transmit the signal components delivered by the band pass filter 39.

The circuit shown in Figure 4 is not intended as a definitive embodiment of the present invention but as an illustration of one of many types of circuits which can function in accordance with the principles described by the present invention. As operated, the circuit shown in Figure 4 involves the bias control of the adder triode 109. It follows, however, that this control could be applied to a suitable type of band pass filter amplifier circuit so that this control could be achieved before the adder 43.

Having described the invention, what is claimed is:

1. In a luminance amplifier in a color television receiver, the combination of, a source of television signals, a first luminance channel filter coupled to said source, said first luminance channel filter including means to function as a band elimination filter in a first prescribed range of frequencies in said television signals, a second luminance channel filter coupled to said source and including means to function as a band pass filter in said first prescribed range of frequencies, an adder circuit, said adder circuit having a first input circuit, a second input circuit and a common output circuit, means for coupling said first luminance channel filter to said first input circuit, means for coupling said second luminance channel filter to said second input circuit, and adder control means, said adder control means responsive to the amplitude level of signal components in a second prescribed range of frequencies in said television signal and including means to control the amount of addition performed in said adder control according to a prescribed relationship with respect to the amplitude level of said signal components in said second prescribed range of frequencies.

2. The invention as set forth in claim 1 and wherein said first luminance channel filter includes a first pair of input terminals and a first pair of output terminals, a first resonant circuit including in shunt a first resistor, a first inductance and a first capacitance, said first resonant circuit connected as a series arm between said first pair of input terminals and first pair of output terminals, a second resonant circuit, said second resonant circuit including a first resistor in shunt with a serially connected second inductance and second capacitance, said second resonant circuit connected across said first pair of output terminals and wherein said second luminance channel filter includes a second pair of input terminals and a second pair of output terminals, a third resonant circuit, said third resonant circuit substantially the same as said first resonant circuit, a fourth resonant circuit, said fourth resonant circuit substantially the same as said second resonant circuit, means for connecting said third resonant circuit as a series arm between said second pair of input terminals and said second pair of output terminals, means for connecting said fourth resonant circuit across said second pair of output terminals, and means for causing each of said resonant circuits to provide a substantially constant resistance as a function of frequency at each of said first and second pair of input terminals.

3. The invention as set forth in claim 1 and wherein said adder control means includes a band pass filter, said band pass filter responsive to said second prescribed range of frequencies, and a signal detector circuit, said signal detector circuit coupled to said band pass filter and including means to provide a reference signal related to the amplitude level of said second prescribed range of frequencies.

4. In a color television receiver, said color television receiver adapted to receive either of two types of television signals; said first type of television signal including a luminance signal; said second type of television signal including a luminance signal, a color modulated subcarrier, and a color synchronizing burst; the combination of, a first luminance channel, said first luminance channel including filter means to eliminate a prescribed range of frequencies in the vicinity of the frequency of said color subcarrier; a second luminance channel, said second luminance channel including filter means to function as a band pass amplifier in said prescribed range of frequencies in the vicinity of said color subcarrier; means to detect said bursts when present and to develop a control voltage indicative of the presence or absence of said bursts, and a second luminance channel amplifier control means, said second luminance channel amplifier control means being operatively connected to control the amplitude level of said second luminance channel responsive to said control voltage for turning said second luminance channel on when said first type of television signal is received.

5. In a color television receiver adapted to receive either of two types of television signals, said first type of television signal including a monochrome information signal, said second type of television signal including a luminance signal and a color modulated subcarrier and color synchronizing bursts which occur in a prescribed frequency range, said first and second types of television signal capable of being identified by the presence or absence of said bursts, the combination of: a first luminance amplifier channel comprising a filter operatively connected as a band elimination filter in a frequency range in which said color modulated subcarrier occurs during said second type of television signal and as a circuit to pass components in other frequency ranges of said television signal, a second luminance amplifier channel comprising a filter operatively connected as a band pass filter to pass frequencies in the frequency range in which said color modulated subcarrier occurs during said second type of television signal, means to apply said television signal to both said first and second luminance amplifier channels, adder circuit means to combine signal components produced at the outputs of said first and second luminance amplifier channels, means responsive to said bursts when present to derive from said television signal a control voltage indicative as to whether said first or second type of television signals is being applied to said first and second luminance amplifier channels, and means responsive to said control voltage and coupled to said adder circuit to control the signal combination of television signal components provided to said adder circuit by said first and second luminance amplifier channels in accordance with said control voltage.

6. In a color television receiver adapted to receive either of two types of brightness information signals wherein different signals strengths of signal components in a given frequency range are indicative of the type of brightness information signal received, the combination of: a first circuit to provide said brightness information signal, a first transmission channel coupled to said first circuit and including apparatus operative to function as a band elimination filter in a first prescribed range of frequencies different from said given frequency range, a second signal channel coupled to said first circuit and including apparatus operative to function as a band pass filter to pass only signal components in said first prescribed range of frequencies, means coupled to said first circuit to derive a control signal responsive to the signal strength of said signal components and to therefrom derive a control signal having an amplitude indicative of the type of signal received, and means responsive to said control signal and operatively connected to said second signal channel to control the transmission level of signal components through said second transmission channel in accordance with the amplitude of said control voltage.

7. A bandwidth control circuit for a color television receiving system including a terminal adapted to receive a television signal comprising, in combination, a first luminance signal filter channel connected to said terminal and responsive to said television signals to provide band elimination filtering of signals in a first range of frequencies of said television signal, a second luminance signal filter channel connected to said terminal and responsive to said television signals to provide band pass filtering of signals in said first range of frequencies of said television signals, means responsive to signals in a second range of frequencies of said television signals to develop a control signal, and means for applying said control signal to said second luminance signal filter channel to control the transmission level thereof in accordance with the amplitude of said signals in said second range of frequencies.

References Cited in the file of this patent

UNITED STATES PATENTS

| | | |
|---|---|---|
| 2,717,276 | Schroeder | Sept. 6, 1955 |
| 2,744,155 | Kihn | May 1, 1956 |
| 2,793,246 | Olive | June 21, 1957 |

OTHER REFERENCES

Color TV, Rider Publication, March 1954, pages 142 and 141.

Introduction to Color Television, Admiral Corporation, pages 7 to 17.